Nov. 13, 1962   E. M. SMITH   3,064,163
CAPACITOR TRIP ARRANGEMENT FOR AN ELECTRIC CIRCUIT BREAKER
Filed July 13, 1959

Inventor:
Eugene M. Smith
by William Freedman
His Attorney.

United States Patent Office 3,064,163
Patented Nov. 13, 1962

3,064,163
CAPACITOR TRIP ARRANGEMENT FOR AN ELECTRIC CIRCUIT BREAKER
Eugene M. Smith, Drexel Hill, Pa., assignor to General Electric Company, a corporation of New York
Filed July 13, 1959, Ser. No. 826,850
9 Claims. (Cl. 317—69)

This invention relates to a tripping arrangement for an electric circuit breaker and, more particularly, to a tripping arrangement that relies upon the discharge of a capacitor to provide the required energy for tripping the breaker.

The usual arrangement for electrically tripping a circuit breaker relies upon a battery that supplies power directly to the usual trip coil of the breaker when tripping is required or desired. Because these batteries are relatively expensive and bulky and require frequent maintenance, efforts have been made to devise tripping arrangements which do not require such batteries, particularly for breakers located in remote substations where frequent maintenance is difficult and costly. One typical tripping scheme of this nature is a capacitor trip arrangement in which a capacitor charged by power derived from a potential-type transformer connected across the main power lines is utilized as a source of tripping energy. When tripping is required, a suitable switch or relay is closed to discharge the capacitor through the breaker trip coil, thereby energizing the trip coil and causing it to operate.

A serious limitation of the conventional capacitor trip arrangement is that loss of power on the main line for only a few minutes or even less renders the tripping arrangement inoperative during the critical interval immediately following reenergization of the power line. This inoperativeness results from the fact that the capacitor loses its charge during the period when the main power line is deenergized, and, as a result, tripping power is not available immediately after reenergization of the main power line.

Primarily for this reason, capacitor trip arrangements have been largely avoided in those applications where there is a likelihood that the main power line (which is the capacitor charging source) would be deenergized for an extended period. The usual practice in such applications has been to use, instead of the capacitor trip device, the usual battery that supplies power directly to the trip coil. This, of course, involves all of the above-described maintenance, space, and expense problems that accompany the use of such batteries.

It is therefore an object of my invention to provide a tripping arrangement which does not require the bulky batteries of direct battery powered trip arrangements and yet is capable of operating in the required manner immediately upon reenergization of its associated main power line after a prolonged outage.

In attaining this object in accordance with one embodiment of my invention, I rely upon a tripping capacitor in combination with two sources of charging power for the capacitor, one source being a normal source deriving its charging power directly from the main power line and the other source being an alternate source of the stored-energy type. The alternate source operates to deliver its stored energy to the capacitor and maintain the capacitor charged when the normal source fails.

Another object of my invention is to design such a combination in such a manner that the alternate source does not have imposed upon it the burden of charging the capacitor from its completely discharged condition. By relieving the alternate source from this duty and by imposing it primarily upon the normal source, I am able to rely upon an inexpensive low-energy alternate source which is required merely to supply enough power to the capacitor to compensate for its normal leakage losses.

Another object is to maintain the capacitor at a higher voltage than the peak terminal voltage of the normal source so that faster tripping operations can be obtained than are obtainable with a capacitor voltage that merely equals the peak terminal voltage of the normal source.

In carrying out my invention in one form, I provide a tripping arrangement which includes a chargeable capacitor and means for discharging the capacitor through the usual trip coil of the breaker in response to predetermined electrical conditions. The tripping arrangement further comprises a normal charging source for charging the capacitor to a predetermined voltage level after discharge thereof, and alternate charging means which operates upon failure of the normal charging source to hold the capacitor charged to a voltage level about as high as said predetermined level. The alternate charging means also acts while the normal source is operative to charge the capacitor to a voltage level higher than said predetermined level and to supply sufficient charging power to said capacitor to compensate for leakage losses from said capacitor so as to maintain the capacitor at the higher voltage.

For a better understanding of my invention, reference may be had to the following specification taken in conjunction with the accompanying drawing, wherein.

Figure 1:
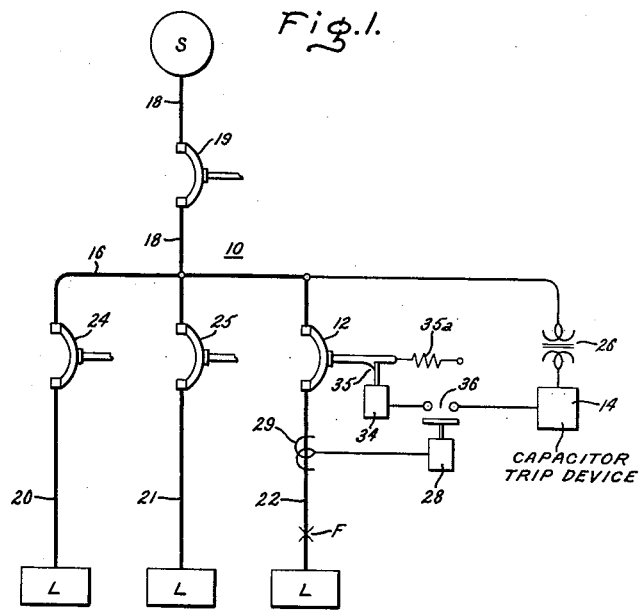
FIG. 1 is a one-line diagram of a power system utilizing a capacitor trip device embodying one form of my invention.

Referring now to the one-line diagram of FIG. 1, there is shown an alternating current power system 10 which includes a circuit breaker 12, the opening operations of which are controlled by a capacitor trip device 14 embodying one form of my invention. The power system 10 comprises a source S of alternating power and a bus 16 that is normally energized from the source S through an incoming line 18 and a main breaker 19 connected in the incoming line 18. Suitable feeder circuits 20, 21, and 22 are connected to the bus 16 for supplying power to suitable loads designated L. A feeder breaker is connected in each of these feeder circuits to provide for interruption of the feeder circuit in the event of fault on the feeder. The breakers for the feeder lines 20 and 21 are respectively designated 24 and 25, and the breaker for the feeder line 22 is the previously-mentioned breaker 12.

The trip device 14 for the feeder breaker 12 is energized from a potential transformer 26 that is preferably connected across the phases of the bus so as to be sensitive to bus voltage. For initiating operation of the trip device 14 in response to a fault (such as indicated at F) on the feeder line 22, an overcurrent relay 28 coupled to the feeder line through a current transformer 29 is provided. This relay operates in response to an overcurrent condition to close its normally-open contacts 36 to cause the trip device 14 to operate. The trip device 14, in operating, causes a trip coil 34 to initiate opening of the breaker 12, thus causing the breaker to interrupt the feeder circuit 22 and isolate the fault from the bus 16. The specific manner in which the relay 28 initiates operation of the tripping device 14 and the specific manner in which the tripping device 14 initiates operation of the breaker 12 will soon be explained in greater detail.

Figure 2:
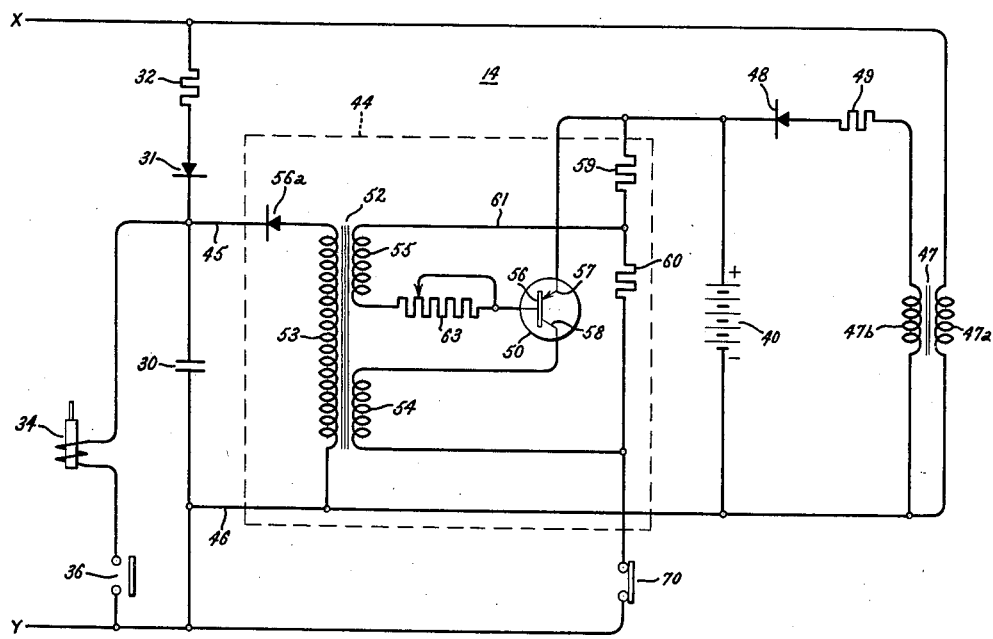
FIG. 2 is a detailed circuit diagram of the capacitor trip device schematically shown in FIG. 1.

Referring now to FIG. 2 which is a detailed view of the capacitor trip device 14, there is shown a pair of input terminals X, Y, across which is connected the series combination of a tripping capacitor 30, a half-wave rectifier 31, and a current limiting resistor 32. These input terminals X, Y are connected across the secondary winding of the control power or potential transformer 26 of FIG. 1 and are therefore supplied with alternating current varying as a function of the voltage on bus 16. It will therefore be apparent that when voltage is present on the bus 16 and, hence, across the input terminals X, Y, power is available to charge the capacitor 30 and to hold it charged. Typically, the voltage across the terminals X, Y will have an effective value of about 230 volts and a peak value of 230.$\sqrt{2}$ or about 325 volts. The combination of the potential type transformer 26, the resistor 32, and the rectifier 31 will be referred to hereinafter as a normal charging source for the capacitor.

Tripping of the breaker 12 of FIG. 1 is effected by energizing the usual trip coil 34 of the breaker, thereby releasing a conventional latch 35 to permit the breaker to open in the usual manner under the influence of an opening spring 35a. The trip coil 34 is shown in FIG. 2 connected across the terminals of the capacitor 30. Connected in series with the trip coil 34 across the terminals of capacitor 30 is a set of normally-open contacts 36 of a protective relay, such as the over-current relay 28 of FIG. 1. When the relay 28 is sufficiently energized in response to an overcurrent condition or some other predetermined condition, it operates to close its contacts 36 thereby completing a discharge circuit across the capacitor 30 through the trip coil 34. The capacitor responds by discharging its energy through the trip coil 34, thereby causing the trip coil to operate and thus effect tripping of the breaker 12.

For maintaining the capacitor 30 charged in the event that power is lost across the input terminals X, Y, I provide an alternate charging source in the form of a small low-voltage, low-energy battery 40. This battery 40 has an output voltage amounting to only a small fraction of the normal voltage across the input terminals X, Y, (e.g., a typical battery voltage is 1.2 volts), but this low output voltage of the battery 40 is converted into a much higher effective voltage by means of an inverter-transformer-rectifier combination 44 (soon to be described in detail) connected across the output terminals of the battery 40. More specifically, the output voltage from the inverter-transformer-rectifier combination 44 is a pulsating unidirectional voltage appearing across the output terminals 45 and 46 of the inverter-transformer-rectifier combination 44. This pulsating unidirectional voltage consists of voltage pulses recurring at a rate of several kilocycles per second with the valleys between such pulses smoothed by the action of the capacitor 30 connected across the output terminals 45 and 46. If voltage is lost across the terminals X, Y, the unidirectional output of the inverter-transformer-rectifier combination 44 acts to maintain the capacitor charged to about the same voltage level as that available from the normal source, thus making the capacitor 30 available for any tripping operation that might be required or desired during this interval when no voltage is available across the normal input terminals X, Y.

For maintaining the battery 40 in a fully charged condition, a battery-charging transformer 47 is provided. This transformer 47 has its primary winding 47a connected across the input terminals X, Y of the trip device 14 and has its secondary winding 47b connected in series with a suitable rectifier 48 and a resistor 49 across the terminals of the battery 40. The secondary voltage of the battery charger is so adjusted that when voltage is present across the terminals X, Y, unidirectional current flows through the rectifier 48 and the battery 40 at a sufficient rate to maintain the battery substantially fully charged. A portion of the output of the charging transformer 47 is also supplied to the inverter-transformer-rectifier combination 44, and such low voltage power is converted into high voltage unidirectional pulsating power by means of the inverter-transformer-rectifier combination 44. When power is being supplied to the inverter-transformer rectifier combination 44 from the battery-charging transformer 47, the output voltage across the terminals 45 and 46 of the inverter-transformer-rectifier unit 44 is substantially higher than the voltage normally appearing across the input terminals X, Y of the trip device 14. Thus, it will be apparent that even when normal voltage is present across the input terminals X, Y, energy will be supplied through the inverter-transformer-rectifier combination 44 to the capacitor 30. The energy supplied through the inverter-transformer-rectifier combination 44 to the capacitor raises the capacitor voltage to a level above the peak voltage across the terminals X, Y and, more specifically, to a voltage level at which leakage losses from the capacitor equal the energy being supplied through the inverter-transformer-rectifier 44 to the capacitor 30. A self-regulating relationship is present inasmuch as leakage losses from the capacitor increase as its terminal voltage increases, thus enabling the capacitor voltage to be stabilized at a level at which the power output from the inverter-transformer-rectifier combination equals the power losses from the capacitor due to leakage. In one typical tripping device, the capacitor is selected so that its voltage is stabilized at about 400 volts in comparison to the 325 volts peak voltage across the terminals X, Y.

This higher voltage enables me to obtain faster tripping times than could be obtained if the capacitor voltage merely corresponded to the peak voltage across terminals X, Y. This is the case because, upon closing of the relay contacts 36, the current rises at a higher rate in the tripping coil 34 of the breaker when the higher capacitor voltage is present. Thus, I am able with my inverter-transformer-rectifier combination 44 to obtain faster tripping operations without requiring a higher voltage across the terminals X, Y. This is most desirable inasmuch as there are usually other devices (not shown) connected across the terminals X, Y which are designed to operate at the relatively low voltage across X, Y and which could not tolerate the higher voltage that is present across the capacitor 30.

Additionally, by allowing the capacitor losses to be supplied through the inverter-transformer-rectifier combination and, thus, holding the capacitor at a higher voltage than that available across the normal source, I am able to utilize a simple continuously oscillating inverter-transformer-rectifier combination 44 which requires no complicated provisions for turning it "off" and "on" or for regulating its voltage output. As will soon appear more clearly my inverter-transformer-rectifier combination 44 has a power output that is largely independent of its output loading and will generate sufficient voltage to force this amount of power into the capacitor irrespective of the instantaneous capacitor voltage.

The inverter-transformer-rectifier combination 44 referred to hereinabove is shown in the drawing as comprising a p-n-p junction type transistor 50; a saturable core transformer 52 having a secondary winding 53, a primary winding 54, and a control winding 55; and a rectifier 56a connected in series with the secondary winding 53 across the capacitor 30. The transistor 50 comprises a base 56, and an emitter 57, and a collector 58. For properly biasing the base 56 with respect to the emitter 57, a voltage divider 59, 60 is connected across the output terminals of the battery 40, and the usual tap from the voltage divider is connected to the base 56 through the series combination of the control or base winding 55 and an adjustable resistor 63. The collector 58 is connected to the negative terminal of the battery 40 through the primary winding 54 of the transformer.

As will soon be explained in greater detail, energy is stored in the inductance of the transformer 52 during the "on" period of the transistor 50 and is delivered to the output circuit at a higher voltage during the "off" period of the transistor 50. More specifically, when the transistor 50 is first energized, the base 56 is biased negative with respect to the emitter due to the voltage drop across portion 59 of the voltage divider 59, 60. As a result, current flows from the emitter 57 to the base 56, and such current causes current to flow from the emitter 57 to the collector 58 into the primary winding 54 of the transformer 52. The flux produced in the core of the transformer 52 by current in the primary winding 54 induces voltage in the control winding 55 and in the secondary winding 53. No current flows in the secondary winding 53 during this interval due to the blocking action of the rectifier 56a. The voltage in control winding 55 drives the base 56 still further negative with respect to the emitter 57, causing more current to flow from the emitter 57 through the collector 58 into the primary winding 54. This, in turn, produces more flux in the core of the transformer 52, which induces more voltage in the control winding 55 and in secondary winding 53. In this manner the transistor is turned fully "on" and remains so until the iron core of transformer 52 saturates. At this time, there is no further change in flux, and, as a result, the voltage induced in control winding 55 and secondary winding 53 disappears. This results in less current flow between the emitter 57 and the base 56, which, in turn, reduces the current in the primary winding 54. The flux in the core of transformer 52 is reduced as a result of the reduction of current in the primary winding 54. This induces a voltage in the winding 55 which opposes the bias from the voltage divider 59, 60. The collapsing flux in the transformer iron thus drives the base of the transistor positive with respect to its emitter, turning the transistor "off." This collapse of flux also induces a voltage in the secondary winding 53 which is in a direction to cause current to flow through the rectifier 56a into the capacitor 30. The transistor 50 remains "off" and current flows through the rectifier 56a until the flux in the transformer iron reaches its residual state, at which time the transistor 50 starts to turn "on" again to repeat the cycle.

The amount of power flowing through the inverter-transformer-rectifier combination 44 can be controlled by adjusting the setting of the controlling resistor 63 in the base circuit and is virtually independent of the loading on the output circuit of the combination 44. Thus, once the resistor 63 is suitably set, the amount of power that will be delivered through the inverter-transformer-rectifier combination to the capacitor 30 will remain substantially constant assuming that the input voltage to the inverter is constant. This amount of power will be supplied to the capacitor 30 irrespective of the extent to which the capacitor is charged, and as a result sufficient voltage will always be developed across the output terminals 45, 46 to force this amount of power into capacitor 30. The amount of output power is so adjusted that it will equal leakage losses from the capacitor at a voltage sufficiently low to avoid damage to the various devices connected across the output terminals 45, 46, such as the capacitor 30, the trip coil 34 and the contacts 36 of the protective relay.

After the capacitor has been discharged to initiate a circuit breaker tripping operation, it is quickly recharged to the level of the voltage across the input terminals X, Y by power supplied from the input terminal X through the rectifier 31. During this charging interval, resistor 32 acts to limit the current sufficiently to protect the rectifier 31 against damage due to overcurrent. As soon as the capacitor voltage equals that present across the terminals X, Y, current ceases to flow into the capacitor 30 through the rectifier 31. Thereafter, all current flowing into the capacitor 30 is derived from the inverter-transformer-rectifier combination 44, which acts to raise the voltage to a level exceeding that which is present across the terminals X, Y. So long as the capacitor voltage equals or exceeds the voltage across the terminals X, Y, no current flows through the rectifier 31 into capacitor 30.

My capacitor trip device 14 can be most advantageously used in the circuit application depicted in FIG. 1. To illustrate this point, assume first that the main circuit breaker 19 of FIG. 1 had been opened and had remained open for a relatively long period of time, say, several minutes or even several hours or days. Assume next that a fault, such as depicted at F, had occurred on the feeder circuit 22 while the main breaker 19 was open and that the main breaker 19 is then operated to closed position while such fault is still present. During the time that the main breaker 19 had been in open position, no voltage was present on the bus 16, thus no voltage was available across the input terminals X, Y of the trip device 14. The trip device 14, however, was not disabled by this absence of voltage because its capacitor 30 was kept charged during this interval by the battery 40 acting through the inverter-transformer-rectifier combination 44. Thus, when the main breaker 19 is operated to closed position, the energy of the capacitor 30 is avaliable to trip the feeder breaker 12 and isolate the bus 16 from the fault, thereby permitting uninterrupted service to be maintained over the bus 16 to the other intact feeder circuits 20 and 21, as would be desired.

In the absence of my auxiliary charging means 40, 44, the capacitor 30 would have become discharged through leakage to an inoperative energy level in less than one minute after the main breaker 19 had been opened. In such case, the capacitor 30 would have been unable to effect the desired tripping of the feeder breaker 12 upon closure of the main breaker 19. This has been a serious limitation with prior capacitor trip devices and has been the basic reason why such devices were not generally used in applications such as that depicted in FIG. 1. In such applications, it has been customary to utilize for tripping purposes a large battery capable of supplying the required energy directly to the trip coil.

It is to be noted that only a few cycles or even less are required for the potential transformer 26 to charge the capacitor from a completely discharged condition to an operative energy level. This is of considerable importance in those applications where the feeder breaker 12 is to be relied upon for high speed automatic reclosing, particularly, in those situations where the bus 16 is momentarily deenergized simultaneously with tripping of the feeder breaker 12 by the capacitor trip device 14 in response to a fault such as F on the feeder circuit 22. In this situation, as soon as the bus 16 is reenergized with the feeder breaker 12 opened, voltage appears on the bus 16 thus charging the capacitor 30 within a few cycles after the bus is reenergized. Assuming that the feeder breaker 12 is a conventional automatic reclosing breaker that has its reclosing operation initiated in the usual manner in response to reenergization of the bus 16, there is no need for delaying reclosing. The breaker 12 can reclose immediately after reenergization of the bus 16. In this connection, even the highest speed reclosing breakers now available require five or more cycles to reclose. During even this very short reclosing interval, the capacitor 30 of my trip device can become charged to the required level and is thus available to trip the breaker 12 in the event that the fault at F is still present.

Because the capacitor 30 can be recharged from a completely discharged condition to an operative energy level in a few cycles by power supplied from the control power transformer 26, there is no need for the battery 40 to dissipate its energy in attempting to maintain the capacitor 30 charged while the breaker is open and the bus 16 is deenergized. To relieve the battery of this duty, I provide a set of contacts 70 which are controlled (in a suitable conventional manner, not illustrated) by the position of the circuit breaker 12. When the breaker 12 is closed, the contacts 70 are closed and when the breaker 12 is open the contacts 70 are open. The contacts 70 are connected in series with all conductive external paths across the terminals of the battery 40, and thus, when the contacts 70 are open, the battery does not dissipate its energy through these external paths.

It is also to be noted that since the battery 40 is normally required merely to supply the losses to the capacitor 30 and not to bring the capacitor up to its working voltage from a completely discharged condition, such battery can be quite small and have a low energy output, especially in comparison to the batteries heretofore used for direct tripping. As an illustration, a typical battery relied upon in my capacitor trip device is only about the size of a flashlight battery. Such a small battery can be, and is, of the completely sealed type and, accordingly, requires none of the maintenance associated with the large vented type batteries generally used for direct tripping arrangements.

Although I have stated hereinabove that successful operation of my capacitor tripping arrangement does not require the battery 40 ever to charge the capacitor from a completely discharged condition, this is not to infer that the battery 40 is incapable of performing this function. If given ample time, e.g., about 15 minutes, the battery 40 can, by itself, charge the capacitor 30 to a workage voltage level.

Although I prefer to rely upon a small low voltage battery in combination with an inverter-transformer-rectifier unit as the auxiliary charging means for charging the capacitor when control power is lost, it will be apparent that the invention in its broader aspects is not limited to this particular alternate charging means. For example, a low energy high voltage battery could be utilized for charging the capacitor directly without reliance upon the inverter-transformer-rectifier combination.

While I have shown and described a particular embodiment of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. An arrangement for supplying electric operating power to the trip coil of a circuit breaker comprising: a chargeable capacitor, means for discharging said capacitor through said trip coil in response to predetermined electrical conditions, a rapid charge means including a normal voltage source for charging said capacitor to a predetermined relatively low voltage after discharge thereof, an auxiliary relatively slow charge means for charging said capacitor to a predetermined high voltage level that is substantially higher than the voltage of said rapid charge means and for supplying charging current to said capacitor, while said normal source is energized, to supply only the leakage losses thereof to maintain said capacitor at said relatively high voltage and a second source of voltage connected to said auxiliary charging means and to said capacitor for supplying only the leakage losses thereof to maintain said capacitor charged approximately to said relatively low voltage in response to failure of said normal charging source.

2. An arrangement for supplying electric operating power to the trip coil of a circuit breaker comprising: a chargeable capacitor, means for discharging said capacitor through said trip coil in response to predetermined electrical conditions, a rapid charge means including a normal voltage source for charging said capacitor at a relatively rapid rate to a predetermined relatively low voltage after discharge thereof, an auxiliary take over and relatively slow charge means for taking over from said rapid charge means and charging said capacitor to a predetermined relatively high voltage level that is substantially higher than the voltage of said rapid charge means and thereafter supplying to said capacitor, while said normal source is fully energized, only the leakage losses thereof to maintain said capacitor at said relatively high voltage level, and a second source of voltage comprising a battery connected to said auxiliary take over and slow charge means for supplying only leakage losses of said capacitor to maintain said capacitor charged approximately to said relatively low voltage in response to failure of said normal source.

3. The arrangement of claim 2 in which the time constant of said capacitor and its connections to said normal charging source provides charging said capacitor from a completely discharge condition to an energy level sufficient to produce circuit breaker tripping within several cycles of commercial frequency power current.

4. An arrangement for supplying electric operating power to the trip coil of a circuit breaker comprising: a chargeable capacitor, means for discharging said capacitor through said trip coil in response to predetermined electrical conditions, a rapid charge means including a normal voltage source for charging said capacitor at a relatively rapid rate to a predetermined relatively low voltage level after discharge thereof, an auxiliary take over and relatively slow charge means for terminating the action of said rapid charge means, and taking over therefrom to charge said capacitor to a predetermined relatively high voltage level and thereafter, while said normal source is fully energized, to supply charging current to said capacitor to supply only the leakage losses thereof to maintain said capacitor at said relatively high voltage level, said take over and slow charge means comprising an inverter-transformer-rectifier unit connected to be supplied from said normal source, and means responsive to failure of said normal source for supplying only leakage losses to maintain said capacitor charged approximately to said relatively low voltage level comprising a battery connected to be charged by current derived from said normal source and connected to discharge into said inverter-transformer-rectifier unit.

5. The arrangement of claim 4 in which said auxiliary take over and slow charge means further comprises a battery charger connected in circuit with said normal charging source, means for supplying a portion of the output of said battery charger to said battery to maintain said battery charged, and means for supplying another portion of the output of said battery charger as input to said inverter-transformer-rectifier unit, the power output from said inverter-transformer-rectifier unit having a voltage level substantially higher than said predetermined voltage level when said inverter-transformer-rectifier unit is receiving power from said battery charger, whereby said capacitor voltage substantially exceeds said predetermined voltage level during the time the battery charger is supplying power to said inverter-transformer-rectifier unit.

6. The arrangement of claim 4 in combination with switch means sensitive to the position of said circuit breaker for disconnecting said inverter-transformer-rectifier unit from said battery when said circuit breaker is opened.

7. An arrangement for supplying electric operating power to the trip coil of a circuit breaker connected in a power line between a source and a load, comprising: a chargeable capacitor, means for discharging said capacitor through said trip coil in response to predetermined electrical conditions, a rapid charge means for charging said capacitor at a relatively rapid rate to a predetermined relatively low voltage level after discharge thereof comprising a potential-type transformer sensitive to the voltage of said power line on the source side of said breaker for deriving normal charging power from said power line, an auxiliary take over and relatively slow charge means for taking over from said rapid charge means and charging said capacitor to a predetermined relatively high voltage level that is substantially higher than the voltage of said rapid charge means and thereafter supplying charging current to said capacitor to supply only the leakage losses thereof to maintain said capacitor at said relatively high voltage level, and a second source of voltage comprising a battery connected to said auxiliary take over and slow charge means and to said capacitor and responsive to failure of voltage on said power line to supply the leakage losses to maintain said capacitor charged approximately to said relatively low voltage level.

8. The arrangement of claim 7 in which said take over and slow charge means acts while said normal charging source is operative (1) to charge said capacitor to a voltage higher than the voltage available from said normal source alone and (2) to maintain said capacitor at said higher voltage by supplying sufficient power to said capacitor to compensate for leakage losses.

9. An arrangement for supplying electric operating power to the trip coil of a circuit breaker connected in a power line between a source and a load comprising a chargeable capacitor, means for discharging said capacitor through said trip coil in response to predetermined electrical conditions, a rapid charge means for charging said capacitor at a relatively low voltage level comprising conductors for deriving said predetermined voltage from the source side of said power line and a circuit connection across said conductors comprising a rectifier and said capacitor in series relationship, an auxiliary take over and relatively slow charge means supplied from said conductors and connected from the common terminal of said rectifier and capacitor to the other terminal of said capacitor for taking over from said rapid charge means at said predetermined low voltage level and further charging said capacitor to a second predetermined voltage level substantially higher than said lower voltage level and thereafter to supply charging current to said capacitor equal to the leakage losses thereof at said higher voltage level, a second source of voltage comprising a battery connected to said auxiliary slow charge means and to said capacitor and responsive to failure of voltage on said power line to maintain said capacitor charged approximately to said relatively low voltage level, and contacts responsive to opening of said circuit breaker for interrupting the connections between said battery and said capacitor.

References Cited in the file of this patent

UNITED STATES PATENTS

| | | |
|---|---|---|
| 2,053,445 | Rose | Sept. 8, 1936 |
| 2,068,351 | Rockwood | Jan. 19, 1937 |
| 2,280,898 | Dyer | Apr. 28, 1942 |
| 2,946,924 | Gerlach | July 26, 1960 |